US012600866B2

(12) United States Patent
Corsini et al.

(10) Patent No.: US 12,600,866 B2
(45) Date of Patent: Apr. 14, 2026

(54) ANTI DRIPPING COATINGS FOR HOODS

(71) Applicant: Whirlpool Corporation, Benton Harbor, MI (US)

(72) Inventors: Francesca Corsini, Origgio (IT); Margherita Basso, Scorzè (IT); Fabio F. Ribas, Stevensville, MI (US); Cesare Guidi, Arona (IT); Chiara Izzo, Travedona Monate (IT)

(73) Assignee: Whirlpool Corporation, Benton Harbor, MI (US)

( * ) Notice: Subject to any disclaimer, the term of this patent is extended or adjusted under 35 U.S.C. 154(b) by 363 days.

(21) Appl. No.: 18/345,118

(22) Filed: Jun. 30, 2023

(65) Prior Publication Data

US 2024/0263017 A1 Aug. 8, 2024

Related U.S. Application Data

(60) Provisional application No. 63/482,846, filed on Feb. 2, 2023.

(51) Int. Cl.
| | |
|---|---|
| *F24C 15/20* | (2006.01) |
| *C09D 5/00* | (2006.01) |
| *C09D 7/20* | (2018.01) |
| *C09D 7/40* | (2018.01) |
| *C09D 7/43* | (2018.01) |
| *C09D 7/62* | (2018.01) |
| *C09D 7/65* | (2018.01) |
| *C09D 133/16* | (2006.01) |
| *C09D 183/16* | (2006.01) |

(52) U.S. Cl.
CPC ................. *C09D 5/00* (2013.01); *C09D 7/20* (2018.01); *C09D 7/43* (2018.01); *C09D 7/62* (2018.01); *C09D 7/65* (2018.01); *C09D 7/67* (2018.01); *C09D 133/16* (2013.01); *C09D 183/16* (2013.01); *F24C 15/20* (2013.01)

(58) Field of Classification Search
USPC ..................................................... 126/300–303
See application file for complete search history.

(56) References Cited

U.S. PATENT DOCUMENTS

| | | | | |
|---|---|---|---|---|
| 2006/0278216 A1* | 12/2006 | Gagas | ................. | F24C 15/2028 126/299 D |
| 2023/0182182 A1* | 6/2023 | Federmann | ............. | B08B 15/02 454/67 |

FOREIGN PATENT DOCUMENTS

| | | | | |
|---|---|---|---|---|
| CN | 108758754 A | 11/2018 | | |
| CN | 115232490 A | 10/2022 | | |
| CN | 115232490 B | * 6/2023 | ............... | B05D 7/14 |

(Continued)

OTHER PUBLICATIONS

European Search Report for EP Application No. 23 183 458.1 dated Dec. 11, 2023, 9 pages.

*Primary Examiner* — Ko-Wei Lin
(74) *Attorney, Agent, or Firm* — Brooks Kushman P.C.

(57) ABSTRACT

A kitchen exhaust appliance includes a body having a plurality of external surface panels and defining an exhaust vent therethrough, and an anti-dripping coating applied to at least one of the external surface panels. The anti-dripping coating is formulated from a solvent and a precursor. Upon application to the at least one of the external surface panels, the anti-dripping coating forms a hydrophobic surface having a water contact angle of at least 90 degrees thereon, or a surface with a low surface energy to avoid droplet conglomeration thereon.

17 Claims, 3 Drawing Sheets

(56)  References Cited

FOREIGN PATENT DOCUMENTS

| DE | 200 16 983 U1 | 1/2001 |
| KR | 10-2021-0130001 A | 10/2021 |
| WO | 2021/124031 A1 | 6/2021 |

\* cited by examiner

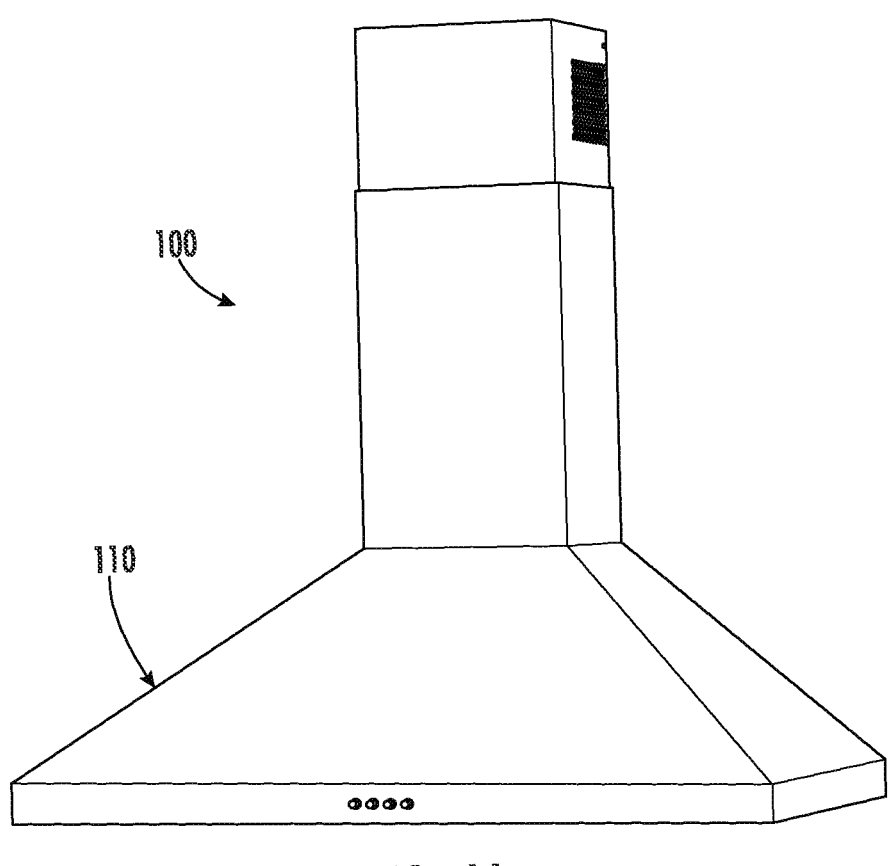
FIG. IA
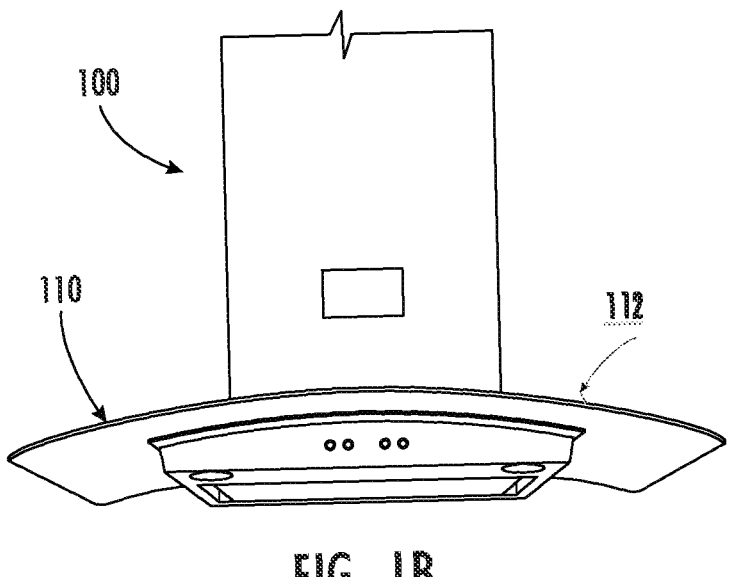
FIG. IB

ANTI DRIPPING COATINGS FOR HOODS

CROSS-REFERENCE TO RELATED APPLICATIONS

This application claims the benefit of U.S. Provisional Application No. 63/482,846 filed Feb. 2, 2023, the disclosure of which is hereby incorporated in its entirety by reference herein.

TECHNICAL FIELD

The present disclosure is directed to a coating composition for a home appliance, and more particularly, a coating composition which reduces dripping from the coating when applied to an appliance surface.

BACKGROUND

Generally, domestic appliances, such as ovens and exhaust hoods, have surfaces that interact with various substances. For example, vapors, food, etc. The surfaces are typically glass surfaces (e.g., an oven door), which have advantageous properties compared to bare steel and other materials, as glass and glass ceramics have smooth appearance and a low roughness level which facilitate cleaning of the surface. In high temperature applications, such as oven doors, the glass surface is often coated with Low Emission (LowE) coating, able to reduce the amount of heat transmitted towards the outer side of the door. The presence of such a coating changes glass surface properties. For example, the small porosity of glass ceramics can be enhanced by LowE coating deposition on the glass surface. However, the cleaning easiness of the LowE coating in an oven application can be variable, given the change in chemical structure and adhesion of substances at high temperatures.

In the example of an exhaust hood, exhaust hoods are usually positioned over a cooktop in consumer kitchens, with surfaces having inclined and rounded shapes. The inclined and rounded surfaces interact differently with vapor generated from heat underneath the exhaust hood (i.e., from a cooktop) when compared with conventional surfaces of exhaust hoods. The surfaces of the exhaust hoods are subject to high steam quantities coming from the cooktop underneath, which result in condensation on the surfaces. Conventional coatings applied to the inclined and curved surfaces still undergo condensation, which starts with fog and then develops into coarse water droplets on the external surface that can drip from the external surface when the droplets form heavier droplets that roll off the curved or inclined surface. These drippings can fall on the kitchen counter or on the cooktop or pots positioned underneath the exhaust hood. Moreover, in exhaust hoods with touch panel controls or displays, touch sensitivity may be compromised by water presence on the control panel, and visibility may be reduced on displays and touch areas based on fog and condensation on the touch display. Additionally, consumers may experience a wet feeling when interacting with the touch displays or panel controls.

In examples where induction cooktops are present under the exhaust hood, the occurrence of dripping on the exhaust hoods increases because the absence of the flame increases the thermal gap between the steam of the cooking (which is hot), and the body of the hood (which is cold), which accentuates the condensation and dripping of liquids on the surfaces of the exhaust hood.

SUMMARY

According to one or more embodiments, a kitchen exhaust appliance includes a body having a plurality of external surface panels and defining an exhaust vent therethrough; and an anti-dripping coating applied to at least one of the external surface panels. The anti-dripping coating is formulated from a solvent and a precursor, wherein the anti-dripping coating upon application to the at least one of the external surface panels forms a hydrophobic surface having a water contact angle of at least 90 degrees thereon.

According to at least one embodiment, the solvent may be alcohol, water, benzene, di-n-butyl ether, an organic solvent, an inorganic solvent, a halogenated solvent, or combinations thereof. In one or more embodiments, the anti-dripping coating is further formulated from a catalyst, and the catalyst may be hydrochloric acid, a mineral acid, an organic acid, an ammonium hydroxide solution, an alkali hydroxide, or a transition metal catalyst. In at least one embodiment, the precursor may be a precursor with a silicon-nitride-oxygen network, a polysiloxane precursor, fluorocarbon precursor, a nonpolar material, or a polymer precursor with combined chemistries. According to at least one embodiment, the precursor may be superhydrophobic fluorinated polyacrylate filled with silica nanoparticle (PFA)/$SiO_2$; ZnO-based nanostructures obtained by hydrophobization of ZnO with low surface energy ligands selected from the group comprising ZnO nanotubes hydrophobized with octadecyltrichlorosilane, or tin oxide or tin nitride nanostructures, nanostructures, nanoparticles, or nano-morphologies using transition metals of d-orbitals and metal oxides. In one or more embodiments, the precursor may include transition metal oxides or nitrides based from elements in Group VIII and Group IB to grow micro- or nanoscale morphologies for the anti-dripping coating. In at least one further embodiment, the transition metal oxides may neutralize and may cause oxidation-reduction reactions, and may be modified with O, N, and S-based ligands to form the hydrophobic surface having a surface energy of less than 35 mN/m. In at least one embodiment, the precursor may be formulated from nanomaterials and may be a solid precursor. In at least one further embodiment, the solid precursor may be carbon nanotubes, ZnO nanorods coated with PTFE, graphene, clays, or other metal oxides nanostructure material. In one or more embodiments, the hydrophobic surface may have a surface energy of less than 35 mN/m. According to at least one embodiment, the at least one of the plurality of external surface panels may be tilted, angled, or curved with respect to a wall which the kitchen exhaust appliance may be mounted to. In at least one embodiment, at least one of the plurality of external surface panels may be a glass surface. In one or more embodiments, at least one of the plurality of external surface panels may be a control panel or display. In one or more embodiments, upon condensation formation on the hydrophobic surface, droplets formed on the hydrophobic surface may have an average diameter of 5 to 200 micrometers.

According to one or more embodiments, a kitchen exhaust appliance includes a body having a plurality of external surface panels and defining an exhaust vent therethrough; and an anti-dripping coating applied to at least one of the external surfaces. The anti-dripping coating is formulated from a solvent and a precursor, the solvent being alcohol, water, benzene, an organic solvent, an inorganic solvent, a halogenated solvent or a combination thereof, and the precursor being cyclosilazanes, di-Me, Me hydrogen, polymers with di-Me, Me hydrogen silazanes, reaction products with 3-(triethoxysilyl)-1-propanamine, hydrocarbons, $C_9$-$C_{11}$ n-alkanes, isoalkanes, cyclics, aromatic compounds, silicone-nitride-oxygen network precursors, polysiloxane precursors, fluorocarbon precursors, nonpolar materials, di-n-butyl ether, or combinations thereof, and, upon application to the at least one of the external surface panels, forms a surface having a water contact angle of at least 70 degrees thereon and a surface energy of less than less than 35 mN/m.

According to at least one embodiment, the anti-dripping coating may have a thermal resistance of up to 500 degrees C. In at least one embodiment, upon condensation formation on the surface, droplets formed on the anti-dripping coating may be less than 1.5 mm in diameter. In a further embodiment, the droplets formed on the surface may have an average diameter of 5 to 200 micrometers. In at least one embodiment, the anti-dripping coating may be further formulated from polyethylene glycol or synthetic polymer thickener.

According to one or more embodiments, an anti-dripping coating formulation for a kitchen exhaust appliance includes 30-50% by weight di-n-butyl-ether, 10-30% by weight Cyclosilazanes, di-Me, Me hydrogen, polymers with di-Me, Me hydrogen silazanes, reaction products with 3-(triethoxysilyl)-1-propanamine, 10-20% by weight Hydrocarbons, C9-C11, n-alkanes, isoalkanes, cyclics, <2% aromatic, and a solvent as the balance by weight of the anti-dripping coating formulation, wherein the solvent is alcohol, water, benzene, an organic solvent, an inorganic solvent, a halogenated solvent, or combinations thereof. In at least one embodiment, the coating may further include 0.1-10% by weight of polyethylene glycol or synthetic polymer thickener.

BRIEF DESCRIPTION OF THE DRAWINGS

FIG. 1A illustrates a perspective view of a exhaust hood;

FIG. 1B illustrates a front elevational view of another example exhaust hood;

DETAILED DESCRIPTION

Figure 2:
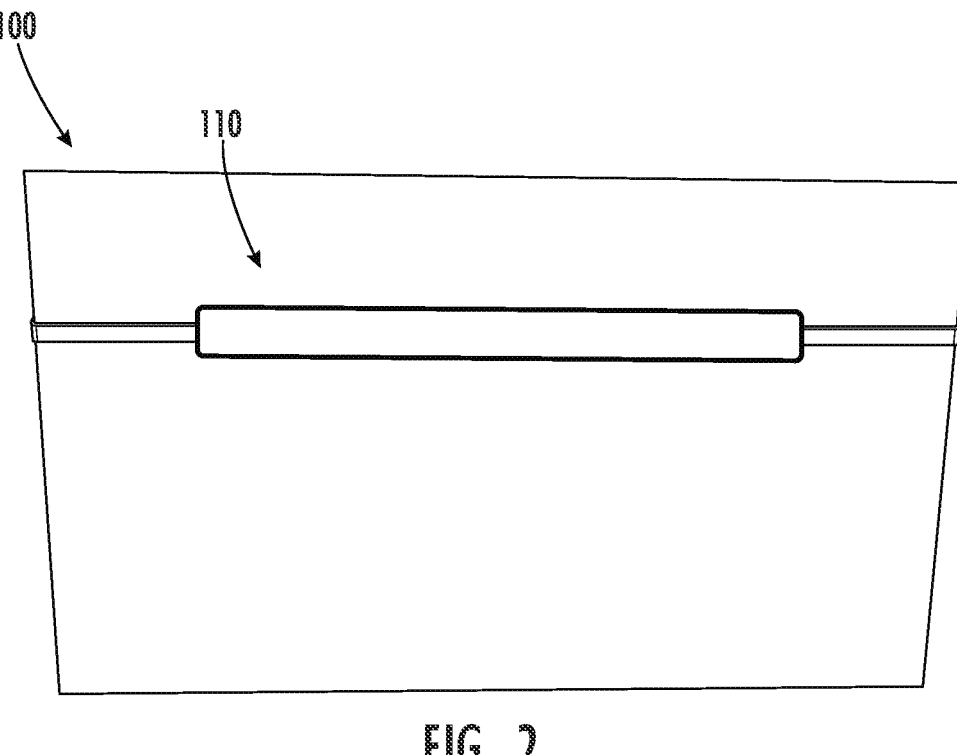
FIG. 2 illustrates a front view of another example exhaust hood.
Figure 3:
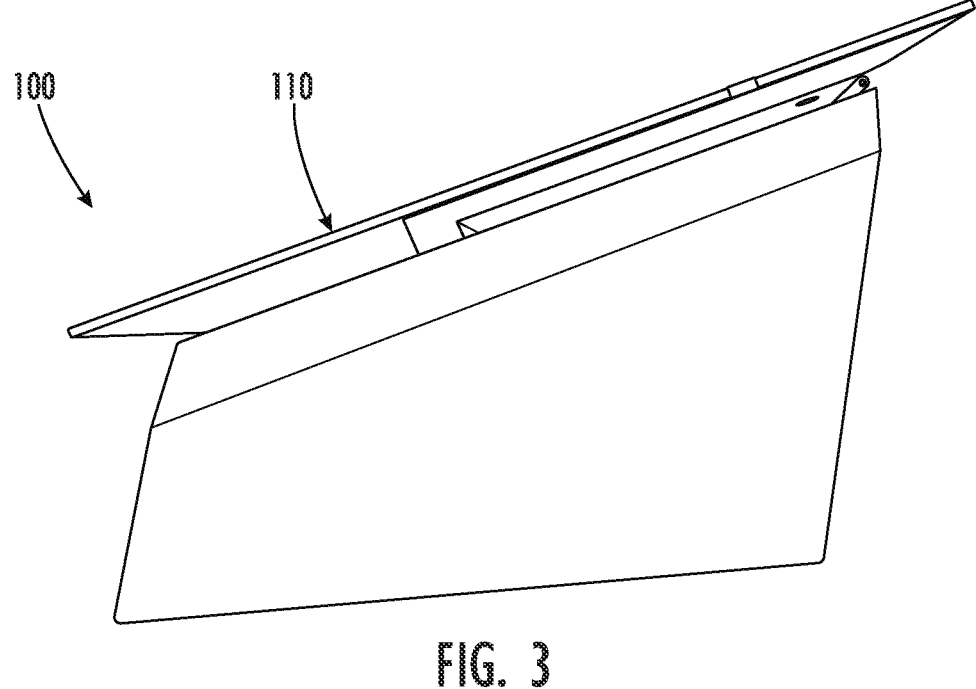
FIG. 3 illustrates a side view of yet another example exhaust hood.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a transparent anti-dripping coating 120 is provided on a domestic appliance, such as exhaust hood 100, as shown in FIGS. 1A-B and FIGS. 2-3. The transparent anti-dripping coating 120 can be applied on top of an already applied LowE coating or onto the bare surface panel 110 of the exhaust hood surfaces, such as the control panel, display, or angled (FIG. 1A) or curved surfaces (FIG. 1B) (collectively, surface panels 110), in order to improve anti-dripping properties without compromising visibility, touch sensitivity, aesthetics, and consumer experience. These surface panels 110 may be glass or other suitable material constructing the exhaust hood, as shown in FIGS. 1A-B. The transparent anti-dripping coating 120 avoids formation of coarse water droplets which may drip onto the cooktop and pots underneath. The coating improves the anti-dripping properties without the need of heating elements and/or filters or air intake systems that cooperate with the surfaces of the exhaust hood.

Exhaust hood 100 may include various surface panels 110 that can receive the anti-dripping coating thereon. The surface panels 110 include, but are not limited to, the shaft of the hood, the overhanging member of the hood, the control panel, the display panel, and any other conventional surface panel included in the construction of an exhaust hood that may be subject or susceptible to condensation thereon. According to one or more embodiments, the surface panels 110 subject to condensation may be made of glass (e.g., the overhanging member 112 of FIG. 1B). The surface panels 110 may be tilted at a certain angle relative to the wall on which the exhaust hood 100 is mounted, or have a portion of the surface panel 110 that is tilted at a certain angle relative to the wall on which the exhaust hood is mounted (e.g., FIG. 1A). For example, the surface panel 110 may be at most at a 450 angle with respect to the wall, which as a result, causes droplets to roll from the surface panel 110 due to gravity. In other examples, the surface panel 110 may be curved (e.g., FIG. 1B) that would result in gravity causing droplets to roll from the surface panel 110. Although the surface panels 110 may be described hereinafter as being glass surfaces, this is not intended to be limiting, and is described as an example, and other materials for the surface to be coated are also contemplated.

Figure 4:
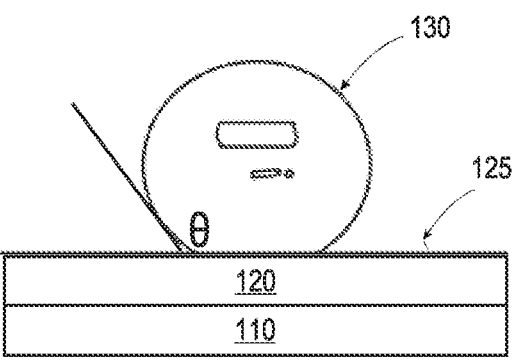
FIG. 4 illustrates a partial schematic cross-section of a coated surface panel of an example exhaust hood, according to one or more embodiments.

As shown in FIG. 4, the exhaust hood 100 includes the transparent coating 120 on the surface panel(s) 110. These surface panels 110 may be glass or other suitable material constructing the exhaust hood, as shown and described with reference to FIGS. 1A-B for receiving the coating 120 thereon. The transparent coating may be, in some embodiments, applied on top of an already applied LowE coating (not shown in FIG. 4) or onto the bare surface panel 110 of the exhaust hood 100 in order to improve anti-dripping properties without compromising visibility, touch sensitivity, aesthetics, and consumer experience of the coated surface panels 110. The transparent anti-dripping coating 120 limits formation of coarse water droplets on the coated surface, which may roll from the surface and onto the cooktop and into pots underneath the exhaust hood 100. The coating 120 improves the anti-dripping properties of the surface panels 110 without the need of heating elements and/or filters or air intake systems that cooperate with the surface panels 110 of the exhaust hood 100 to limit or evaporate condensation formed thereon.

In one or more embodiments, as shown in FIG. 4, the transparent anti-dripping coating may be a hydrophobic coating such that the coating 120 forms a coated surface 125 thereon. The coated surface 125 may be a low surface energy surface of a hydrophobic surface, as will be discussed with respect to various embodiments described herein. As such, the transparent anti-dripping coating 120 can impart hydrophobic properties to the coated surface panels 110 of the exhaust hood 100. The coated surface 125 may have, in some embodiments, a water contact angle $\Theta$ (as shown in FIG. 4) of at least 70° in some examples, and at least 90° in other examples. The water contact angle may vary depending on thickness and curing conditions of the coating, as well as concentration/dilution of coating mixture, however the contact angle of at least 70° in certain examples, and 90° in further examples, is imparted to the coated surface 125 via the coating as a resultant property of the coating 120 on the surface panels 110. As such, according to one or more embodiments, an anti-dripping coating 120 (or, in some embodiments, anti-dripping nanocoatings) on one or more surface panels 110 of the exhaust hood 100 is provided.

According to one or more embodiments, the anti-dripping coating 120 may be applied in any suitable manner, such as, but not limited to, as a liquid or a solid. For liquid application, the application processes may be any suitable process based on the chemical composition of the selected solution and the desired properties of the final coating (i.e., thickness, mechanical properties, etc.). For example, for applying the anti-dripping coating 120 as a liquid, the liquid may be applied by dipping, brushing, spraying, chemical or physical vapor deposition, layer-by-layer assembly/self-assembly, sol-gel deposition, lithography, electroplating, or other suitable method(s).

According to one or more embodiments, where the coating or nanocoating is applied as a liquid formulation, the liquid formulation of the anti-dripping coating 120 includes a solvent and a precursor. In at least one embodiment, the formulation may further include a catalyst. In one or more embodiments, the solvent may be, but is not limited to, alcohol, water, benzene, halogenated solvents, or other suitable solvent and any combinations thereof. In one or more embodiments, where a catalyst is included, the catalyst may be, but is not limited to, hydrochloric acid, mineral acids, organic acids, ammonium hydroxide solution, alkali hydroxides, transition metal catalysts, or other suitable catalyst and any combinations thereof.

In one or more embodiments, the precursor for the anti-dripping coating 120 or nanocoating may be a single precursor for the coating, or a combination of precursors. For example, the precursor may be a polysiloxanes precursor (—Si—O—Si— groups), fluorocarbon precursor ($CF_2$ or $CF_3$ groups, or combinations thereof), nonpolar material (with bulky $CH_2$ or $CH_3$ groups, or combinations thereof), or a polymer precursor with combined chemistries. Non-limiting examples of precursors for an anti-dripping nanocoating include superhydrophobic fluorinated polyacrylate filled with silica nanoparticle (PFA)/$SiO_2$, ZnO-based nanostructures obtained by hydrophobization of ZnO with low surface energy ligands such as ZnO nanotubes hydrophobized with octadecyltrichlorosilane, or tin oxide or tin nitride nanostructures, nanoparticles or nano-morphologies using various transition metals of d-orbitals and metal oxides. Furthermore, transition metal oxides and/or nitrides and nanomaterials based on the elements in Group VIII and Group IB (e.g., Fe, Co, Ni, Cu, and Ag) may be other suitable materials to grow micro- or nanoscale morphologies for the anti-dripping coating 120 or nanocoating by using neutralization and oxidation-reduction reactions in addition to modifying them with O, N, and S-based ligands to effectively achieve nanocoatings with any low surface energy material. As such, the anti-dripping coating 120 exhibits a low surface energy when coated on the surface panels 110. The low surface energy is exhibited in the coating on the coated surface by having a water contact angle (e.g., of at least 70°) such that water droplet formation on the coated surface 125 is delayed or avoided, to impede water droplets that would coarse and combine, and thus form larger drops that would roll and fall from the surface as bigger droplets. Thus, a low surface energy, as evidenced by a contact angle of at least 70° in some examples, and at least 90° in other examples, allows the coating to form a fine mist/fog of droplets 130 on the coated surface 125, as shown in FIG. 4, but inhibits the fog to coarse or conglomerate in bigger droplets, and thus allows the fog to evaporate more quickly and more easily than when bigger droplets are formed.

In embodiments where the anti-dripping coating 120 is formulated as a nanocoating, the nanocoating can be formulated from a solid precursor. The solid precursor may be, in some embodiments, carbon nanotubes, ZnO nanorods coated with PTFE by radio frequency sputtering, graphene, clays, a metal oxide nanostructure material (e.g., $TiO_2$), or other suitable nanoparticle or coated nanoparticle. The nanoparticle may have any suitable construction, such as, but not limited to tubes, flakes, rods, spheres, or other suitable shape to form a precursor for the anti-dripping coating 120.

According to at least one other embodiment, the anti-dripping coating 120 may include a silicon-nitride-oxygen network, such that the anti-dripping coating 120 on the coated surface 125 has a water contact angle higher than an uncoated glass surface and higher than a glass coated with only a LowE coating. The silicon-nitride-oxygen network may provided via a cyclosilazane component. For example, the cyclosilazane component may be a Cyclosilazanes, di-Me, Me hydrogen, polymers with di-Me, Me hydrogen silazanes, reaction products with 3-(triethoxysilyl)-1-propanamine, polysiloxane precursors, fluorocarbon precursors, or nonpolar materials. As such, the anti-dripping coating 120 according to one or more embodiments may be a formulated as a liquid coating that has a chemical composition including: a solvent (e.g., alcohol, water or benzene) and the following components: di-n-butyl-ether; Cyclosilazanes, di-Me, Me hydrogen, polymers with di-Me, Me hydrogen silazanes, reaction products with 3-(triethoxysilyl)-1-propanamine; and Hydrocarbons, $C_9$-$C_{11}$, n-alkanes, isoalkanes, cyclics, <2% aromatics. In at least one further embodiment, the anti-dripping coating 120 may optionally include a synthetic polymer thickener, such as PGB (polyethylene glycol) or other suitable thickening agent. Additionally, the liquid coating may include other suitable fillers or additives, without departing from the properties achieved by the liquid coating when applied to the surface panels 110.

In one or more embodiments, where the anti-dripping coating 120 includes a silicon-nitride-oxygen network, the composition of liquid coating may include 30-50% by weight di-n-butyl-ether, 10-30% by weight Cyclosilazanes, di-Me, Me hydrogen, polymers with di-Me, Me hydrogen silazanes, reaction products with 3-(triethoxysilyl)-1-propanamine, 10-20% by weight Hydrocarbons, $C_9$-$C_{11}$, n-alkanes, isoalkanes, cyclics, <2% aromatic, with solvent being the balance % by weight of the liquid coating. The coating 120 may further include, in some embodiments, a small percentage (i.e., 0.1-10% by weight) of polyethylene glycol or other suitable synthetic polymer thickener.

After application of an anti-dripping coating 120 according to any of the above embodiments, the finished surface panel 110 with the anti-dripping coating 120 exhibits anti-condensation and/or anti-fog functionality. The finished surface panel with the anti-dripping coating 120 has a water contact angle higher than uncoated glass and LowE coated glass (e.g., at least 70° in some embodiments, and at least 90° in other embodiments), with the anti-dripping coating 120 exhibiting a surface energy in some examples of less than 35 mN/m, less than 32 mN/m in other examples, from 20 to 32 mN/m in further examples, and from 25 to 32 mN/m in yet further examples. The water droplets 130 which may condense on the finished surface panel 110 with the anti-dripping coating 120 on the coated surface 125 may have an average droplet size of under 1.5 mm, in some embodiments, and with an average diameter of 5 to 200 micrometers in other embodiments, and 75 to 150 micrometers in yet further embodiments, such that water forms a mist thereon, as opposed to large droplets that combine to form larger droplets that may roll off the surface panel or otherwise affect aesthetics, touch sensitivity, or consumer experience.

According to one or more embodiments, a kitchen exhaust appliance 100 includes a body having a plurality of external surfaces panels 110, and defining an exhaust vent therethrough, and an anti-dripping coating 120 applied to at least one of the external surface panels 110. The anti-dripping coating 120 is formulated from a solvent and a precursor in the formulation. The formulation may optionally include a catalyst. The anti-dripping coating 120 forms a coated surface 125 having a water contact angle of at least 90 degrees thereon with a low surface energy in order to inhibit formation of large condensation droplets or coarse droplets that combine and roll from the surface panel.

According to one or more embodiments, a kitchen exhaust appliance 100 includes a body having a plurality of external surface panels 110 and defining an exhaust vent therethrough, with at least one of the plurality of external surface panels 110 including a control panel. An anti-dripping coating is applied to at least one of the external surface panels 110. The anti-dripping coating includes a solvent, such as water, alcohol, benzene, di-n-butyl ether, halogenated solvents, or combinations thereof, and a precursor such as cyclosilazanes, di-Me, Me hydrogen, polymers with di-Me, Me hydrogen silazanes, reaction products with 3-(triethoxysilyl)-1-propanamine, olysiloxane precursors, fluorocarbon precursors, or nonpolar materials, and, optionally, polyethylene glycol or other synthetic polymer thickener. The anti-dripping coating forms a coated surface 125 having a water contact angle of at least 70 degrees thereon with a low surface energy in order to inhibit formation of large condensation droplets or coarse droplets that combine and roll from the surface panel.

EXPERIMENTAL RESULTS

The performance of a coated and uncoated glass hood surface panel was examined. A pot containing 1 L of boiling water was placed on the induction hob positioned at a distance of 67 cm from the hood surface panel, and the induction cooktop is active for the entire duration of the test. Two test cases have been examined, Case 1: where the ventilation system of the exhaust hood is off; and Case 2: where the ventilation system of the exhaust hood is on.

Within the first half minute (approximately 30 seconds), in both uncoated and coated glass hoods, a fine fog layer with micrometric droplets dimensions appears on the surface panel.

Then, in uncoated glass hoods the formation of coarse water droplets on the surface panel starts to take place after 2-3 min (for Case 1 where the ventilation system of the exhaust hood is off) and 7 min (for Case 2 where the ventilation system of the exhaust hood is on). Notably, in the examination of the coated surface panel of the glass hood, the phenomenon of coarse water droplet formation is not visible even after 180 minutes of continuous exposure to vapor steam. This result is indicative of a high evaporation rate of the fog layer on the coated surface panel.

As such, because of the lower evaporation rate of the fog layer on the uncoated surface panel, the dripping phenomenon caused by formation of coarse water droplets, which combine and eventually roll, is only observable in the uncoated hoods, and this dripping phenomenon occurs after about 9 to 15 min (for Case 1 where the ventilation system of the exhaust hood is off) and about 22 min (for Case 2 where the ventilation system of the exhaust hood is on).

At the end of the test cases, the hob is turned off and the pot is removed. The test procedure was repeated different times to measure different key parameters, which are summarized below.

The time for fog evaporation: in the coated hoods, the rate of fog dissolution is greatly improved, and the evaporation time is around 3 minutes in Case 1 (where the ventilation system of the exhaust hood is off); and around 2 minutes in Case 2 (where the ventilation system of the exhaust hood is on). Instead, in the uncoated hoods, the fog evaporation time is approximately 8 min for Case 1; and approximately 11 min for Case 2.

The mass of the water deposited on the entire glass surface of the hood: this parameter gives an indication of the probability that water condensation (and thus, dripping phenomenon) occurs on the glass surface panel of the exhaust hood. In fact, this parameter is strictly affected by the rate of fog evaporation and by the affinity of water on the surface panel of the glass hood. The mass of the water was assessed by absorbing the entire water quantity present on the coated and uncoated surface of the glass hood with an absorbent paper towel. The difference in weight for the absorbent paper towel is measured to determine water content. The paper towel was weighed before (while dry) and after water removal from the surface (with water absorbed in the paper towel) to determine the amount of water.

The quantity of water condensed on uncoated surface panels of the glass hoods, as measured by the weight difference of the absorbent paper towel, was 1.14 g in Case 1; and 0.53 g in Case 2.

Instead, a remarkably lower quantity of water was deposited on the coated surface panel of the glass hoods. The quantity of water condensed on the coated surface panels of the glass hoods, as measured by the weight difference of the absorbent paper towel, was 0.37 g in Case 1; and 0.03 g in Case 2. Thus, the efficacy of the anti-dripping coating present on the glass panel is notable.

The dimension of water droplets: The difference in water droplets dimension (as measured as the average diameter of the droplet, taken along a general diameter of the droplet) during steam exposure was also measured by a stereomicroscope. The dimension of the water droplets is an important parameter in gauging anti-fog performance of a coating for a glass hood. The dimension of the water droplets is an important parameter in gauging anti-fog performance of a coating for a glass hood. The average diameter of water droplets on the uncoated surface panels of the glass hoods is about 2-3 mm, with some larger droplets up to 5 mm; and on the coated surface panels of the glass hoods varies from about 5 to 200 micrometers.

All numerical quantities in this description indicating amounts of material or conditions of reaction and/or use are to be understood as modified by the word "about" in describing the broadest scope of the technology. Practice within the numerical limits stated is generally preferred. As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects can be obtained within a range of +/−5% of the indicated value. The term "substantially" or "generally" may be used herein to describe embodiments. The term "substantially" or "generally" may modify a value or relative characteristic. In such instances, "substantially" or "generally" may signify that the value or relative characteristic it modifies is within ±0%, 0.1%, 0.5%, 1%, 2%, 3%, 4%, 5% or 10% of the value or relative characteristic.

Also, unless expressly stated to the contrary: all R groups (e.g. Ri where i is an integer) include hydrogen, alkyl, lower alkyl, C1-6 alkyl, C6-10 aryl, C6-10 heteroaryl, −NO2, —NH2, –N(R'R"), —N(R'R"R''')+L-, Cl, F, Br, —CF3, —CCl3, —CN, —SO3H, —PO3H2, —COOH, —CO2R', —COR', —CHO, —OH, —OR', —O-M+, —SO3-M+, —PO3-M+, —COO-M+, —CF2H, —CF2R', —CFH2, and —CFR'R" where R', R" and R''' are C1-10 alkyl or C6-18 aryl groups; single letters (e.g., "n" or "o") are 1, 2, 3, 4, or 5; in the compounds herein a CH bond can be substituted with alkyl, lower alkyl, C1-6 alkyl, C6-10 aryl, C6-10 heteroaryl, —NO2, —NH2, —N(R'R"), —N(R'R"R''')+L-, Cl, F, Br, —CF3, —CCl3, —CN, —SO3H, —PO3H2, —COOH, —CO2R', —COR', —CHO, —OH, —OR', —O-M+, —SO3-M+, —PO3-M+, —COO-M+, —CF2H, —CF2R', —CFH2, and —CFR'R" where R', R" and R''' are C1-10 alkyl or C6-18 aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the technology implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1, to 2.1 the following numbers 1.2, 1.3, 1.4, 1.5, 1.6, 1.7, 1.8, 1.9, and 2.0 can be selected as lower or upper limits.

In the specific examples set forth herein, concentrations, temperature, and reaction conditions (e.g. pressure, pH, flow rates etc.) can be practiced with plus or minus 50 percent of the values of the examples indicated, rounded to or truncated to three significant figures. In a refinement, concentrations, temperature, and reaction conditions (e.g., pressure, pH, flow rates, etc.) can be practiced with plus or minus 30 percent of the values indicated rounded to three significant figures of the value provided in the examples. In another refinement, concentrations, temperature, and reaction conditions (e.g., pressure, pH, flow rates, etc.) can be practiced with plus or minus 10 percent of the values indicated rounded to three significant figures of the value provided in the examples.

It must also be noted that, as used in this description, the singular form "a," "an," and "the" comprise plural referents unless the context clearly indicates otherwise. For example, reference to a component in the singular is intended to comprise a plurality of components.

For purposes of description herein the terms "upper," "lower," "right," "left," "rear," "front," "vertical," "horizontal," and derivatives thereof shall relate to a front perspective view of a device. However, it is to be understood that the device may assume various alternative orientations and step sequences, except where expressly specified to the contrary. It is also to be understood that the specific devices and processes described in the description are simply exemplary embodiments of the concepts protected by this document. Hence, specific dimensions and other physical characteristics relating to the embodiments disclosed herein are not to be considered as limiting, but as examples.

The descriptions of the various embodiments have been presented for purposes of illustration, but are not intended to be exhaustive or limited to the embodiments described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A kitchen exhaust appliance comprising:
a body having a plurality of external surface panels and defining an exhaust vent therethrough; and
an anti-dripping coating applied to at least one external surface panel of the plurality of external surface panels, the anti-dripping coating formulated from a solvent and a precursor, the precursor being a precursor with a silicon-nitride-oxygen network, a polysiloxane precursor, fluorocarbon precursor, a nonpolar material, or a polymer precursor with combined chemistries, wherein, upon application to the at least one external surface panel, the anti-dripping coating forms a hydrophobic surface having a water contact angle of at least 90 degrees thereon.

2. The kitchen exhaust appliance of claim 1, wherein the solvent is alcohol, water, benzene, di-n-butyl ether, an organic solvent, an inorganic solvent, a halogenated solvent, or combinations thereof.

3. The kitchen exhaust appliance of claim 1, wherein the anti-dripping coating is further formulated from a catalyst, and wherein the catalyst is hydrochloric acid, a mineral acid, an organic acid, an ammonium hydroxide solution, an alkali hydroxide, or a transition metal catalyst.

4. The kitchen exhaust appliance of claim 1, wherein the precursor is superhydrophobic fluorinated polyacrylate filled with silica nanoparticle (PFA)/SiO2; ZnO-based nanostructures obtained by hydrophobization of ZnO with low surface energy ligands selected from the group comprising ZnO nanotubes hydrophobized with octadecyltrichlorosilane, tin oxide, or tin nitride nanostructures, nanostructures, nanoparticles, or nano-morphologies using transition metals of d-orbitals and metal oxides.

5. The kitchen exhaust appliance of claim 1, wherein the precursor includes transition metal oxides or nitrides based from elements in Group VIII and Group IB to grow micro- or nanoscale morphologies for the anti-dripping coating.

6. The kitchen exhaust appliance of claim 5, wherein the transition metal oxides neutralize and cause oxidation-reduction reactions, and are modified with O, N, and S-based ligands to form the hydrophobic surface having a surface energy of less than 35 mN/m.

7. The kitchen exhaust appliance of claim 1, wherein the precursor is formulated from nanomaterials and is a solid precursor.

8. The kitchen exhaust appliance of claim 7, wherein the solid precursor is carbon nanotubes, ZnO nanorods coated with PTFE, graphene, clays, or a metal oxide nanostructure material.

9. The kitchen exhaust appliance of claim 1, wherein the hydrophobic surface has a surface energy of less than 35 mN/m.

10. The kitchen exhaust appliance of claim 1, wherein the at least one of the plurality of external surface panels is tilted, angled, or curved with respect to a wall which the kitchen exhaust appliance is mounted to.

11. The kitchen exhaust appliance of claim 1, wherein at least one of the plurality of external surface panels is a glass surface.

12. The kitchen exhaust appliance of claim 1, wherein at least one of the plurality of external surface panels is a control panel or display.

13. The kitchen exhaust appliance of claim 1, wherein upon condensation formation on the hydrophobic surface, droplets formed on the hydrophobic surface have an average diameter of 5 to 200 micrometers.

14. A kitchen exhaust appliance comprising:

a body having a plurality of external surface panels and defining an exhaust vent therethrough; and an anti-dripping coating applied to at least one external surface panel of the plurality of external surface panels, the anti-dripping coating is formulated from a solvent and a precursor, the solvent being alcohol, water, benzene, an organic solvent, an inorganic solvent, a halogenated solvent or a combination thereof, and the precursor being cyclosilazanes, di-Me, Me hydrogen, polymers with di-Me, Me hydrogen silazanes, reaction products with 3-(triethoxysilyl)-1-propanamine, hydrocarbons, $C_9$-$C_{11}$ n-alkanes, isoalkanes, cyclics, aromatic compounds, silicone-nitride-oxygen network precursors, polysiloxane precursors, fluorocarbon precursors, nonpolar materials, di-n-butyl ether, or combinations thereof, wherein, upon application to the at least one external surface panel, the anti-dripping coating forms a surface having a water contact angle of at least 70 degrees thereon and a surface energy of less than less than 35 mN/m.

15. The kitchen exhaust appliance of claim 14, wherein the anti-dripping coating has a thermal resistance of up to 500 degrees C.

16. The kitchen exhaust appliance of claim 14, wherein, the anti-dripping coating is further formulated from polyethylene glycol or synthetic polymer thickener.

17. The kitchen exhaust appliance of claim 14, wherein the droplets formed on the surface have an average diameter of 5 to 200 micrometers.

* * * * *